(12) United States Patent
Kim et al.

(10) Patent No.: US 12,099,111 B2
(45) Date of Patent: Sep. 24, 2024

(54) DETECTION METHOD AND DETECTION DEVICE

(71) Applicant: UIF (University Industry Foundation), Yonsei University, Seoul (KR)

(72) Inventors: Tae Wook Kim, Seoul (KR); Jung Woon Park, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 385 days.

(21) Appl. No.: 17/546,663

(22) Filed: Dec. 9, 2021

(65) Prior Publication Data
US 2022/0187439 A1   Jun. 16, 2022

(30) Foreign Application Priority Data

Dec. 15, 2020   (KR) .................. 10-2020-0175279
Dec. 2, 2021    (KR) .................. 10-2021-0170602

(51) Int. Cl.
*G01S 13/58*   (2006.01)
*G01B 21/20*   (2006.01)

(52) U.S. Cl.
CPC .............. *G01S 13/58* (2013.01); *G01B 21/20* (2013.01)

(58) Field of Classification Search
CPC ........ G01S 13/58; G01S 7/2921; G01S 7/417; G01S 13/284; G01S 13/581; G01S 7/415; G01S 13/02; G01S 7/285; G01S 13/50; G01B 21/20
See application file for complete search history.

(56) References Cited

U.S. PATENT DOCUMENTS

| 4,905,008 A * | 2/1990 | Kawano .................... G01S 7/34 342/22 |
| 2020/0191937 A1* | 6/2020 | Farley ................... G01S 13/505 |

OTHER PUBLICATIONS

Korean Office Action for related KR Application No. 10-2021-0170602 mailed Oct. 23, 2023 from Korean Intellectual Property Office.
Piljae Park et al., "A Continuous Sweep-Clock-Based Time-Expansion Impulse-Radio Radar", IEEE Transactions on Circuits and Systems-I: Regular Papers, Sep. 2018, pp. 3049-3059, vol. 65, No. 9.

* cited by examiner

*Primary Examiner* — Peter J Macchiarolo
*Assistant Examiner* — John M Royston
(74) *Attorney, Agent, or Firm* — Paratus Law Group, PLLC

(57) ABSTRACT

A detection device includes a transmitter for outputting an impulse signal and a receiver for receiving and processing a reflected signal obtained by reflecting the impulse signal from a target. The receiver includes a sample and extension unit that samples a received signal and extends a duration of a value obtained by sampling the received signal to form an extended signal extended to a frequency lower than a frequency of the reflected signal.

18 Claims, 6 Drawing Sheets

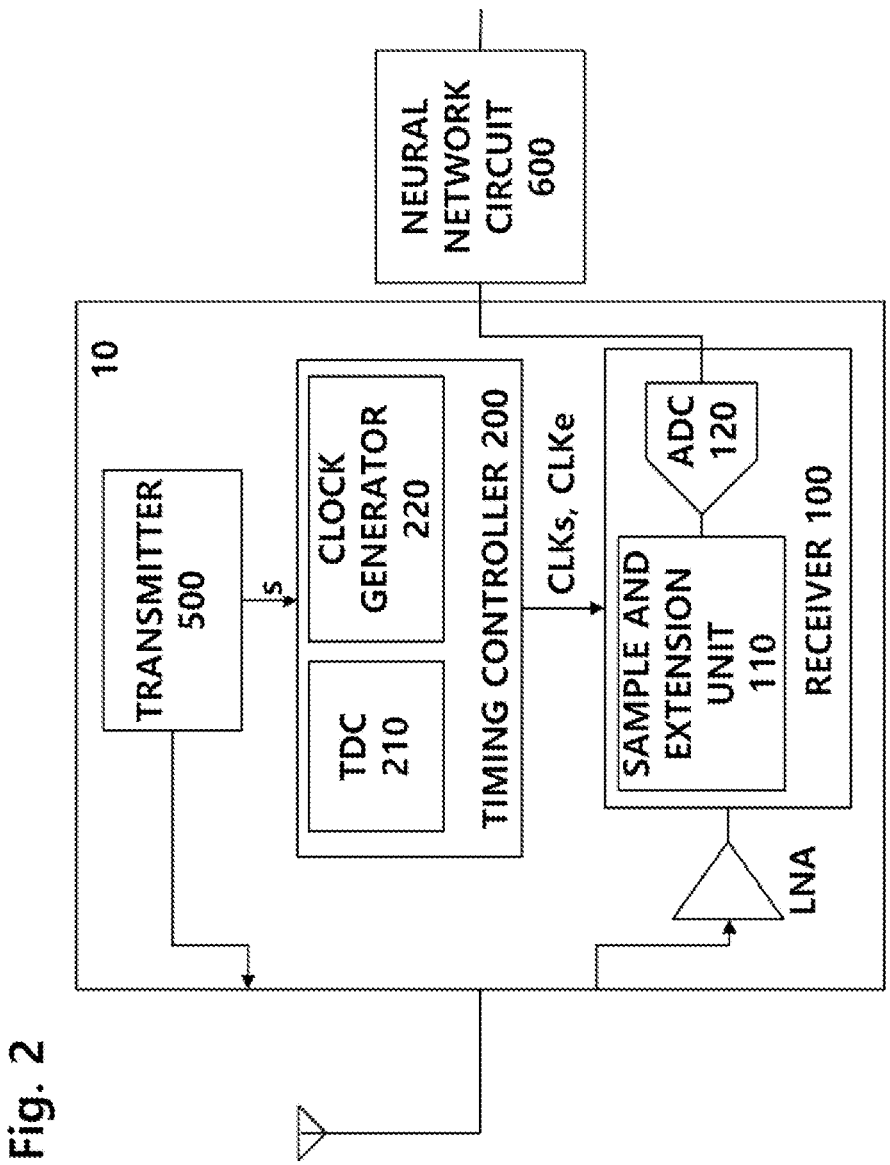
Fig. 2
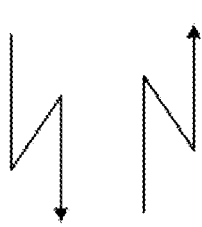

DETECTION METHOD AND DETECTION DEVICE

CROSS-REFERENCE TO RELATED APPLICATIONS

This application claims priority to and the benefit of Korean Patent Application No. 10-2020-0175279, filed on Dec. 15, 2020 and 10-2021-0170602, filed on Dec. 2, 2021, the disclosure of which are incorporated herein by reference in their entirety.

BACKGROUND

The present disclosure relates to a detection method and a detection device.

Detection devices that detect humans, animals, or external objects are continuously being developed. This technique is a method of obtaining an image by optically recognizing an external object and processing the image or a method of recognizing an object by emitting a radio wave.

A technique for optically recognizing an external object is sensitive to a change in an external environment and the accuracy of detection depends on the change in the external environment. Furthermore, the quality of an obtained image depends on an optical element, such as a lens, for obtaining the image and thus an expensive optical element should be used to secure the reliability of a detected result.

When a signal reflected from an object is detected by emitting a radio wave, both the emitted radio wave and the signal reflected from the object have high frequencies and expensive devices such as a high-speed sampler and a high-speed analog-to-digital converter are required to detect and interpret the signal.

Embodiments set forth herein are intended to solve the problem of the related art described above. That is, one of aspects of the embodiments set forth herein provides a technique for detecting an external object by a non-optical method, whereby an object and a movement and shape of the object are detected with high accuracy without using expensive elements.

SUMMARY

A detection device according to an embodiment includes a transmitter for outputting an impulse signal and a receiver for receiving a reflected signal obtained by reflecting the impulse signal from a target, wherein the receiver includes a sample and extension unit that samples a received signal and extends a duration of a value obtained by sampling the received signal to form an extended signal extended to a frequency lower than a frequency of the reflected signal.

According to an aspect of the embodiment, the target may include at least one of an animal, an object, a human, and a human movement outside the detection device.

According to an aspect of the embodiment, the receiver may include a sample and extension unit including a plurality of unit sample and extension circuits, and the plurality of unit sample and extension circuits may each include an input node to which the reflected signal is input, an output node from which the extension signal is output, a storage element storing a value obtained by sampling the reflected signal, a sampling switch connected between the input node and the storage element and configured to sample the reflected signal, and an extension switch connected between the storage element and the output node and configured to output the extended signal.

According to an aspect of the embodiment, in the plurality of unit sample and extension circuits, the input nodes may be connected to each other and the output nodes may be connected to each other.

According to an aspect of the embodiment, the sampling switch may be operated by a sampling clock, and the extension switch may be operated by an extension clock of a frequency lower than a frequency of the sampling clock to output a value stored in the storage element and form the extended signal.

According to an aspect of the embodiment, the receiver may further include an analog-to-digital converter configured to receive the extended signal and form a digital code corresponding to the extended signal.

According to an aspect of the embodiment, the detection device may further include a neural network circuit configured to receive the digital code and detect the target's movement corresponding to the digital code.

According to an aspect of the embodiment, the detection device may further include a low-noise amplifier (LNA) configured to receive and amplify a signal reflected from the target to form the reflected signal.

According to an aspect of the embodiment, the detection device may further include a timing controller, and the timing controller may include a time-to-digital converter (TDC) configured to generate a digital code corresponding to a point in time that sampling is started by the sample and extension unit, and a sampling clock generator configured to receive the digital code and form a plurality of sampling clocks starting from the point in time that sampling is started.

According to an aspect of the embodiment, the timing controller may divide the reflected signal into a plurality of time sections and control the TDC to generate a digital code corresponding to a start point of each of the plurality of time sections, and the sampling clock generator may receive the digital code corresponding to the start point of each of the plurality of time sections, and form and output a plurality of sampling clocks starting from the start point of each of the plurality of time sections.

A detection method according to an embodiment includes emitting an impulse signal, receiving a reflected signal obtained by reflecting the impulse signal from a target, and sampling and extending the reflected signal to form an extended signal extended to a frequency lower than a frequency of the reflected signal.

According to an aspect of the embodiment, the target may include at least one of an animal, an object, a human, and a human movement outside the detection device.

According to an aspect of the embodiment, the sampling and extending of the reflected signal may include sampling the reflected signal by a sampling clock, and forming the extended signal by outputting a value, which is obtained by sampling the reflected signal, at a frequency lower than a frequency of the sampling clock, the value may be a bit obtained by quantizing the reflected signal, and the sampling of the reflected signal and the forming of the extended signal may be performed a plurality of times.

According to an aspect of the embodiment, the sampling of the reflected signal may be performed by controlling a switch at a point in time that the sampling clock is provided to store a value of the reflected signal, and the forming of the extended signal may be performed by outputting a value of the reflected signal sampled by a switch conducted at a frequency lower than a frequency of the sampling clock.

According to an aspect of the embodiment, a pre-charging process may be performed before the sampling of the reflected signal.

According to an aspect of the embodiment, the detection method may further include receiving the extended signal and forming a digital code corresponding to the extended signal after the forming of the extended signal.

According to an aspect of the embodiment, in the detection method, a neural network circuit may receive the digital code and detect the target's movement corresponding to the digital code.

According to an aspect of the embodiment, in the detection method, the reflected signal may be formed by amplifying a signal reflected from the target by a low-noise amplifier (LNA). According to an aspect of the embodiment, the detection method may further include generating a digital code corresponding to a time period from a point in time that the impulse signal is output to a point in time that the reflected signal is received, and forming a plurality of sampling clocks to correspond to the digital code starting from the point in time that the reflected signal is received.

According to an aspect of the embodiment, the detection method may further include dividing the reflected signal into a plurality of time sections, generating a digital code corresponding to a start point of each of the plurality of time sections, and receiving the digital code corresponding to the start point of each of the plurality of time sections and forming and outputting a plurality of sampling clocks starting from the start point of each of the plurality of time sections.

According to an embodiment, a movement and shape of an object can be detected with a high accuracy without using expensive components.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 2 is a diagram schematically illustrating a detection device according to an embodiment;

DETAILED DESCRIPTION

Figure 1:
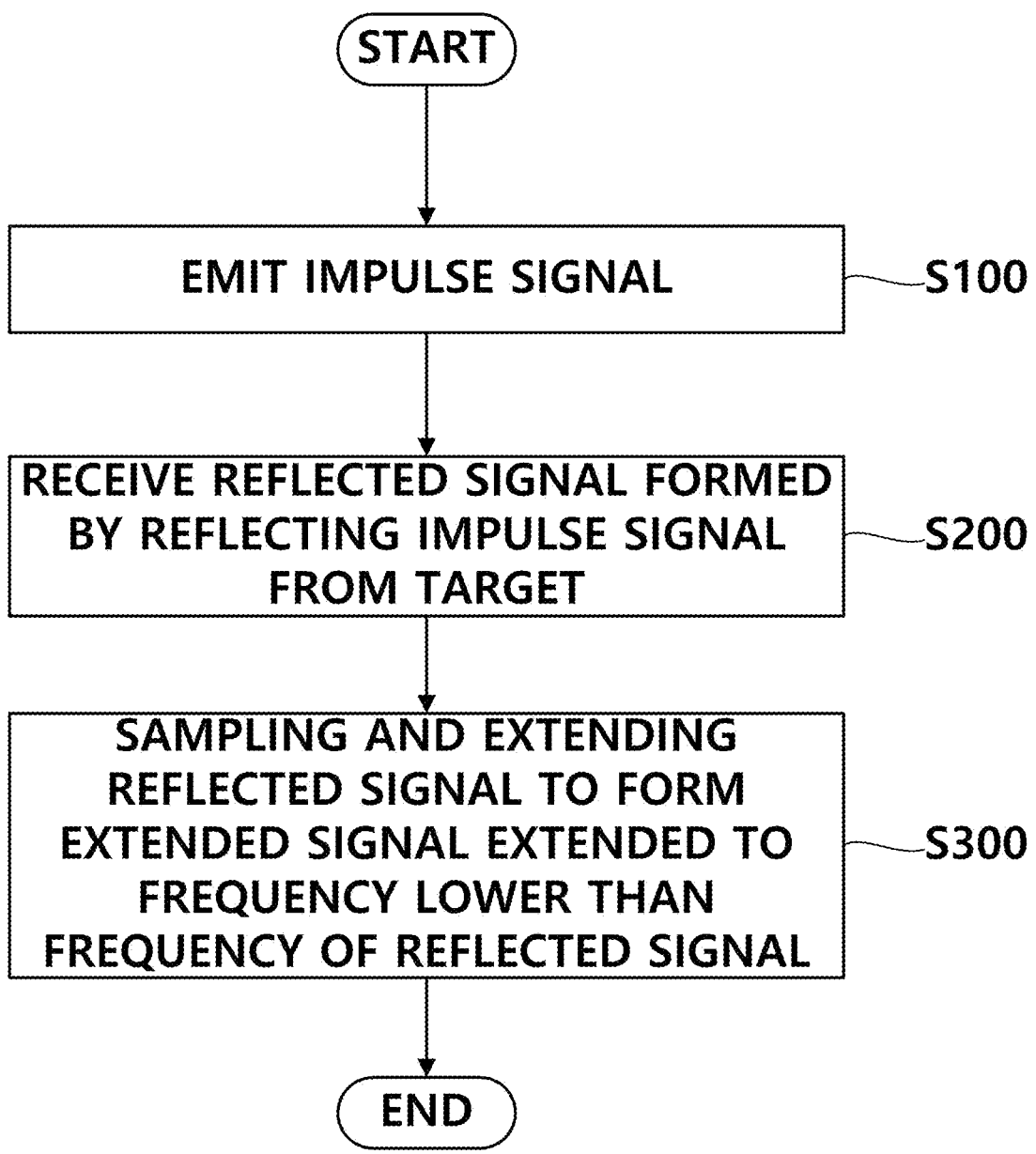
FIG. 1 is a diagram schematically illustrating a detection method according to an embodiment.

Hereinafter, embodiments will be described in detail with reference to the accompanying drawings. FIG. 1 is a diagram schematically illustrating a detection method according to an embodiment. FIG. 2 is a diagram schematically illustrating a detection device according to an embodiment. Referring to FIGS. 1 and 2, the detection method of the embodiment includes: emitting an impulse signal (S100), receiving a reflected signal obtained by reflecting the impulse signal from a target (S200), and sampling and extending the reflected signal to form an extended signal Se extended to a frequency lower than a frequency of the reflected signal (S300).

A detection device 10 includes a transmitter 500 for outputting an impulse signal and a receiver 100 for receiving and processing a reflected signal obtained by reflecting the impulse signal from a target T. The receiver 100 includes a sample and extension unit 110 that samples a received signal and extends a duration of a value obtained by sampling the received signal to form an extended signal extended to a frequency lower than a frequency of the reflected signal.

In an embodiment, the detection device 10 further includes a timing controller 200, and the timing controller 200 includes a time-to-digital converter (TDC) 210 and a clock generator 220.

Figure 3:
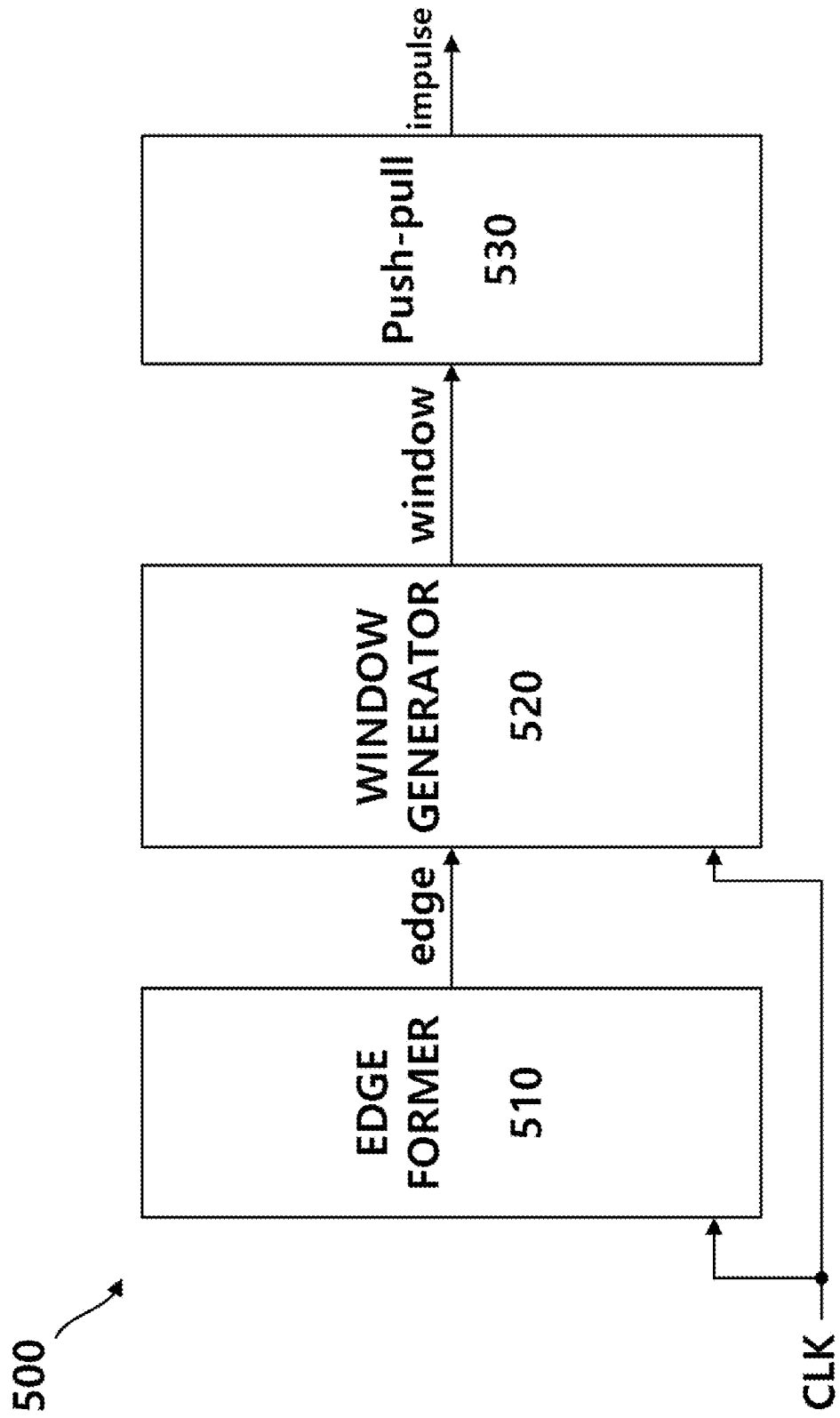
FIG. 3 is a schematic block diagram of a transmitter.
Figure 4:
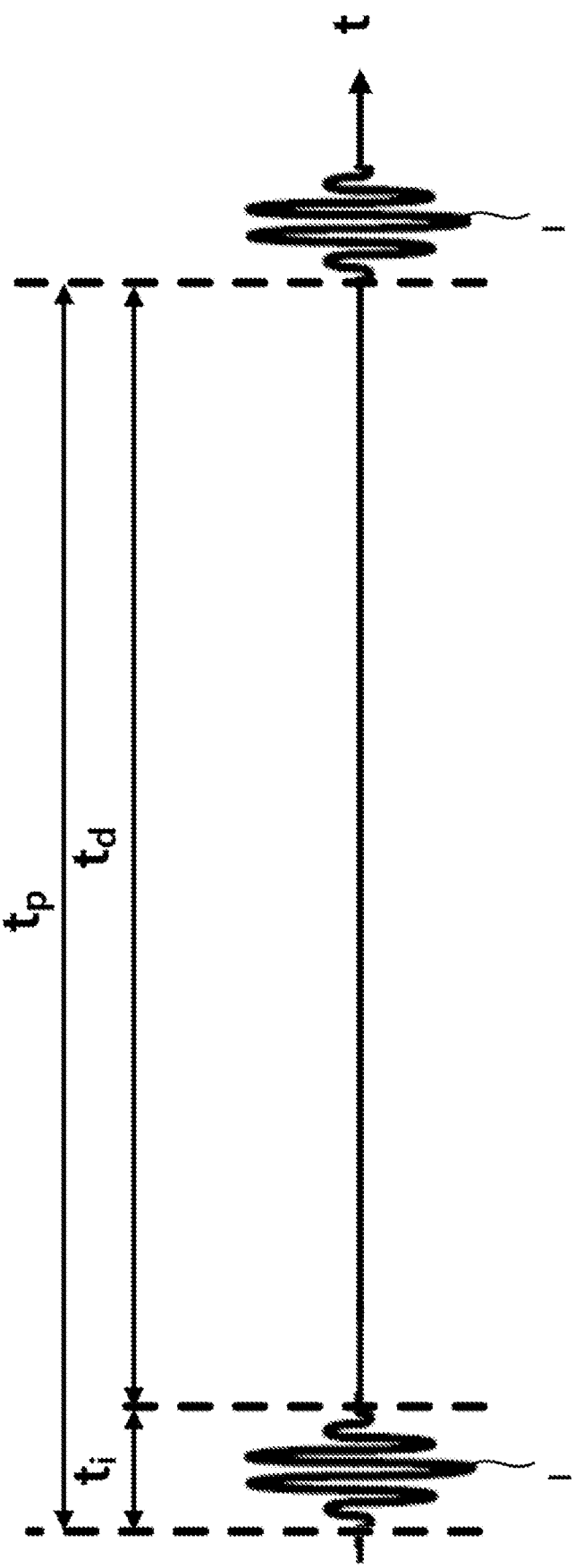
FIG. 4 is a diagram schematically illustrating an impulse signal formed and emitted by a transmitter.

FIG. 3 is a schematic block diagram of a transmitter 500. FIG. 4 is a diagram schematically illustrating an impulse signal formed and emitted by the transmitter 500. Referring to FIGS. 3 and 4, the transmitter 500 may include an edge former 510, a window generator 520, and a push-pull stage 530. In an embodiment not shown, the transmitter 500 may further include a power amplifier to amplify the impulse signal I with an amount of power sufficient to wirelessly emit the impulse signal I, and an antenna.

The edge former 510 receives a clock signal CLK, delays the clock signal CLK to form an edge, and outputs the edge to the window generator 520. In the illustrated embodiment, a reference edge of the clock signal CLK used to form the edge is a rising edge. The edge is provided to the window generator 520 to form a window. The clock signal CLK is provided to the window generator 520.

The window generator 520 delays the edge by a predetermined delay time by at least one delay cell and combines a plurality of edges corresponding to the delayed edge to form a window. The formed window may be in the form of a combination of rising edges and falling edges. The window is provided to the impulse generator 530, and in an embodiment, the impulse generator 22 outputs the formed window to the push-pull stage 530 and controls a bias current of the push-pull stage.

The push-pull stage 530 receives the window, forms an impulse signal I with an amplitude corresponding to the intensity of the bias current, and outputs the impulse signal I.

As illustrated in FIG. 4, the transmitter 500 may transmit the impulse signal I by adding a dead time $t_d$, which is longer than a duration $t_i$ of the impulse signal I, to the impulse signal I (S100). As will be described below, a process of extending a received reflected signal Rx is performed for the dead time $t_d$. Thus, the dead time $t_d$ is a duration sufficient to perform the process of extending the reflected signal Rx.

In an embodiment, one period $t_p$ of a signal transmitted from the transmitter 500 may be 100 to 1000 times longer than the duration $t_i$ of the impulse signal I. For example, when the duration $t_i$ of the impulse signal I is 2 nsec, one period $t_p$ of the signal may be a value that is within a range of 200 nsec to 2 μsec. As illustrated in FIG. 2, the transmitter 500 may output a start signal s to the timing controller 200 while emitting a signal.

The emitted signal is reflected and modified from the target T. In an embodiment, the target T may be an object, such as a human or an animal, located outside the detection device 10. Alternatively, the target T may be part of an object, such as a human hand. A waveform of the signal emitted from the transmitter 500 is modified according to, for example, the shape of the hand, e.g., a hand signal, a fist, or a folded palm. Thus, various types of poses such as a hand signal, a hand gesture, a body motion, and a gesture using the body may be detected.

Furthermore, the target T may be an object such as a human or an animal, and a signal output from the transmitter 500 may be modified according to the object's movement and a movement of the target T may be detected from the modified signal.

Figure 5:
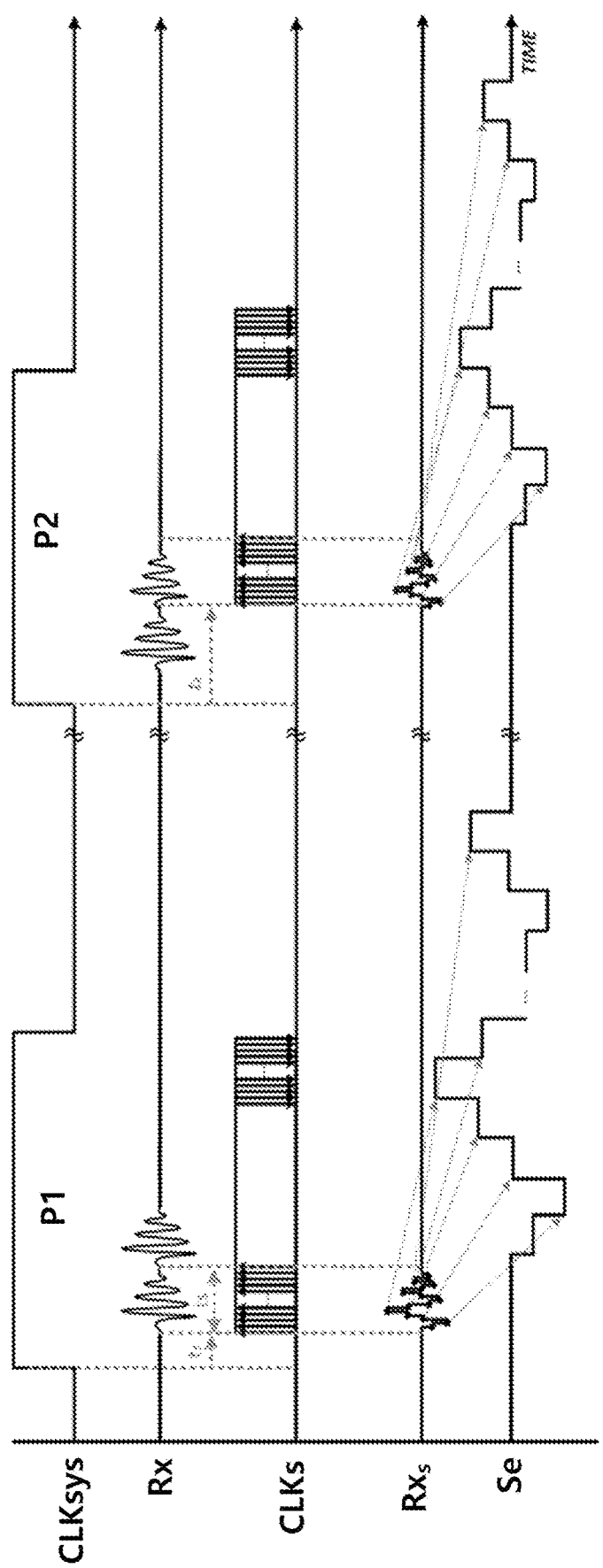
FIG. 5 is a schematic timing diagram for describing an operation of a receiver.

FIG. 5 is a schematic timing diagram illustrating an operation of a receiver 100. Referring to FIGS. 1 to 5, a reflected signal reflected and modified from a target T is shown as Rx in FIG. 5. As shown in the drawings, a waveform of the modified reflected signal Rx is changed according to a target's movement, shape or the like.

The TDC 210 receives a start signal S provided from the transmitter 500 before a first period P1, detects a time difference t1 until the reflected signal RX is received, and forms and outputs a digital code corresponding to the time difference t1. The clock generator 220 receives the digital code output from the TDC 210 and provides a sampling clock CLKs in the first period P1, starting from a point in time that the reflected signal Rx is received, so that the receiver 100 may sample the reflected signal Rx.

As shown in FIG. 5, the reflected signal RX may be divided into a plurality of sections and sampling may be performed on each of the sections. For example, an impulse signal I transmitted from the transmitter 500 may be reflected from the target T, thereby extending a duration. For example, when a duration of the impulse signal I transmitted from the transmitter 500 is 2 nsec, a duration of the reflected signal Rx may be extended to 3 nsec or more. In this case, it may be difficult to sample an entire reflected signal, the duration of which is extended for one period. Therefore, the reflected signal may be divided into a plurality of sections and sampling may be performed on each of the sections.

The present embodiment will be described below with respect to, for example, a case in which a reflected signal is divided into two sections. However, the embodiment is only an example, and sampling may be performed without dividing the reflected signal or by dividing the reflected signal into three or more sections.

The TDC 210 calculates an initial time point of each section of the reflected signal Rx and provides a digital code, and the clock generator 220 receives the digital code and generates and provides a sampling clock CLKs so that the receiver 100 may perform sampling starting from the calculated initial time point. The reflected signal Rx may be sampled more sensitively and accurately by dividing the reflected signal Rx into a plurality of sections and sampling each of the sections.

Figure 6:
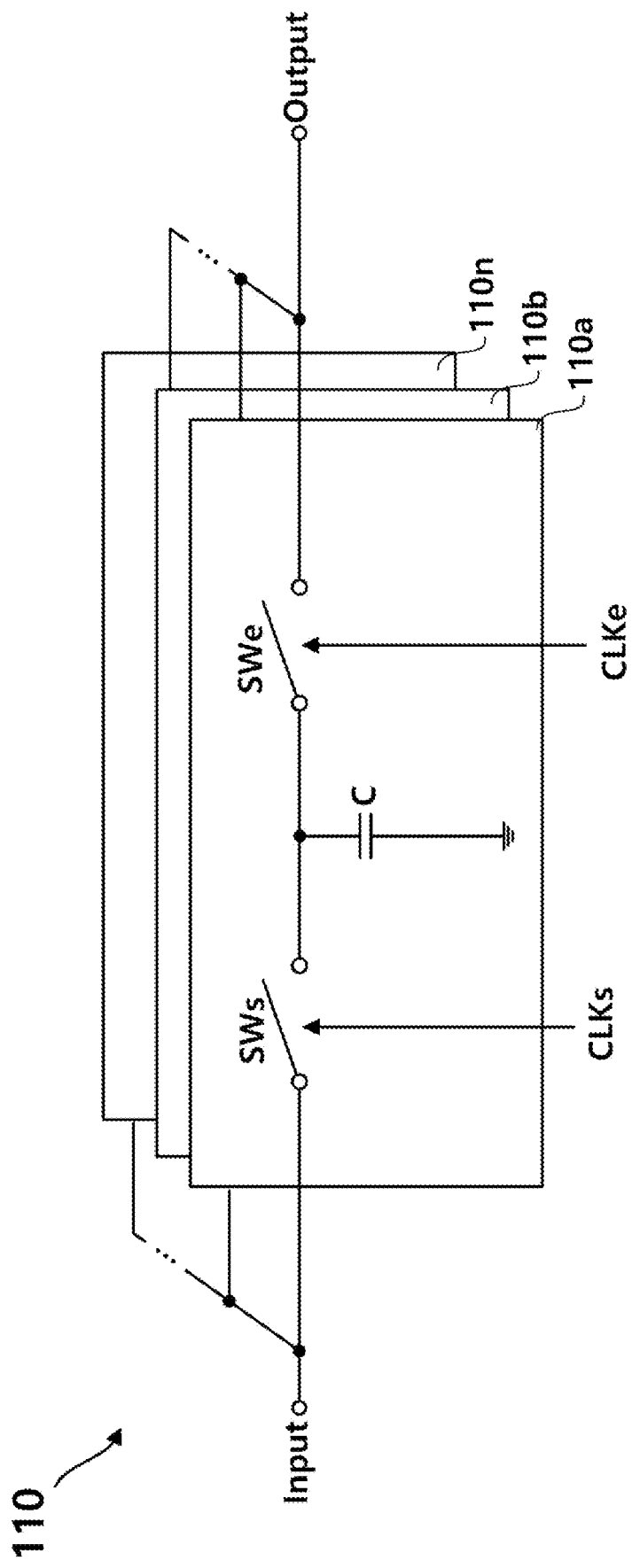
FIG. 6 is a schematic block diagram of a sample and extension circuit unit according to an embodiment.

FIG. 6 is a schematic block diagram of a sample and extension circuit unit 110 according to an embodiment. Referring to FIG. 6, the sample and extension circuit unit 110 include a plurality of unit sample and extension circuits 110a, 110b, . . . , 110n. Each of the unit sample and extension circuits 110a, 110b, . . . , 110n includes an input node Input to which a reflected signal Rx is input, an output node Output for outputting an extended signal Se obtained by extending a result of sampling the reflected signal $Rx_s$, a storage element C storing a voltage obtained by sampling the reflected signal Rx, a sampling switch SWs connected between the input node Input and the storage element C to sample the reflected signal Rx, and an extension switch SWe connected between the storage element C and the output node Output to output the extended signal Se.

In an embodiment, the sample switch SWs receives a sampling clock CLKs from the clock generator 220 and samples the reflected signal Rx, and the extension switch SWe receives an extension clock CLKe of a frequency lower than that of the sampling clock CLKs from the clock generator 220 and extends the sampled reflected signal $Rx_s$ to form an extended signal Se. In an embodiment, a sampling clock has a frequency of 33 GHz and each sample switch may operate at a speed of about 30 psec. An extension clock may operate at a frequency of 50 MHz, and both the frequencies of the sampling clock and the extension clock are adjustable.

An operation of the sample and extension circuit unit 110 will be described below. The reflected signal Rx amplified by the LNA is input to the reflected signal 100 through the input node Input. All of the input nodes of the unit sample and extension circuits 110a, 110b, . . . , 110n are connected to the input node Input of the sample and extension circuit unit 110. All of the output nodes of the unit sample and extension circuit 110a, . . . are connected to the output node Output of the sample and extension circuit unit 110.

As the reflected signal RX is input to the input node Input, the sampling clock CLKs is provided to a control electrode of the sampling switch SWs, the storage element C is charged with electric charges due to the reflected signal Rx, and a voltage of the reflected signal Rx at a sampling time is formed thereat. In an embodiment, the reflected signal Rx may be consecutively provided to the storage element C in a state in which the sampling switch SWs is conducted and be sampled as the storage element C is charged with electric charges due to the reflected signal Rx at the sampling time when the sampling switch SWs is opened by the sampling clock CLKs.

In another embodiment, although the sampling switch SWs is opened, the sampling switch SWs is conducted by the sampling clock CLKs and thus the storage element C is charged with electric charges due to the reflected signal Rx, and the reflected signal Rx may be sampled at a sampling time.

After the unit sample and extension circuit 110a completes sampling of the reflected signal Rx, the clock generator 220 may provide the sampling clock CLKs to the unit sample and extension circuit 110b to sample the reflected signal Rx, and a sampling process may be performed until sampling performed by a predetermined number of unit sample and extension circuits is completed.

As the storage element C is charged with electric charges, a voltage is formed in the storage element C. When the clock generator 220 generates an extension clock CLKe and provides the extension clock CLKe to a control electrode of the extension switch SWe, the extension switch SWe is conducted and outputs the voltage, which is formed in the storage element C, through the output node Output. Because the conducting and blocking of the extension switch SWE are controlled by the extension clock CLKe, the sampled reflected signal $Rx_s$ may be extended to have a desired duration by appropriately controlling a pulse width and a frequency of the extension clock CLKe, as illustrated in FIG. 5.

In an embodiment, an interval between edges of the extension clock CLKe provided to each extension switch SWe may be determined such that extension may be performed during a dead time of a pulse. For example, when the sample and extension circuit unit 110 includes forty extension switches SWe, intervals between extension clocks provided to the extension switches SWe may each be set to 20 ns so as to restore a signal of 50 MHz and the signal may be entirely extended within a period of 1 μs of a system clock including a dead time.

In a sampling and extension process of an embodiment, a sampling process of the unit sample and extension circuit 110b is performed when the sampling process of the unit sample and extension circuit 110a is completed. After the sampling processes of the unit sample and extension circuits 110a, 110b, . . . , 110n included in the sample and extension circuit unit 110 are completed, extended signals Se may be sequentially output starting from the unit sample and extension circuit 110a. As samples and extended signals are sequentially output, a logic of the timing controller 200 may be simplified.

In a sampling and extension process of another embodiment, a sampling process of the unit sample and extension circuit 110b may be performed when a sampling process of the unit sample and extension circuit 110a is completed. In this case, as the sampling process of the unit sample and extension circuit 110b is performed, the unit sample and extension circuit 110a may output the extended signal Se. As described above, a sample and an extended signal are output by a pipeline method to alleviate effects due to charge leakage of the storage element C.

In an embodiment, the sample and extension circuit unit 110 may further perform a process of preparing for charging the storage element C with a predetermined voltage before sampling is performed using the unit sample and extension circuits 110a, 110b, . . . , 110n.

Thereafter, sampling and extension are performed for a subsequent section of the reflected signal Rx in a second period P2. As described above, in the first period P1, the TDC 210 generates and outputs a code corresponding to a time difference t1 between a point in time that a start signal s is input and a point in time that the reflected signal Rx is received. The clock generator 220 receives the code and provides a sampling clock CLKs after the time difference t1.

In the second period P2, the TDC 210 calculates a start time point t2 of the second period P2 by adding the time different t1 and a time is during which sampling is performed in the first period P1, and generates a code corresponding to the start time point t2. The clock generator 220 receives the code corresponding to the start time point t2 and provides a sampling clock CLKs to the unit sample and extension circuits 110a, 110b, . . . , 110n after the time difference t2 to perform sampling and signal extension.

As the unit sample and extension circuits 110a, 110b, . . . , 110n sequentially output extended signals Se, an extended signal Se obtained by extending the sampled reflected signal Rx is formed at the output node Output of the sample and extension circuit unit 110 and is input to an analog-to-digital converter (ADC) 120. The ADC 120 forms and outputs a digital code corresponding to the input extended signal Se.

In an embodiment, the ADC 120 may store the code formed in the first period P1, add the code to the code formed in the second period P2 to form a code corresponding to a reflected signal, and output the formed code.

A neural network circuit 600 receives a digital code output from the ADC 120 and detects a target corresponding to the digital code. In an embodiment, the neural network circuit 600 may be a neural network circuit trained in advance with a pattern of a code according to a target to be detected.

For example, the neural network circuit 600 may be trained with a body movement such as a movement of a hand or a finger or a gesture, and receive a code output from the ADC 120, identify a body movement or a gesture corresponding to the code, and output a signal corresponding thereto.

As another example, the neural network circuit 600 may be trained with an object such as a human or an animal, receive a code output from the ADC 120, identify whether an object corresponding to the code is a human, an animal, or another object, and output a signal corresponding to the identified object. Furthermore, the neural network circuit 600 may be trained with an object's movement, identify the object's movement, and output a signal corresponding to the object's movement.

In the present embodiment, a signal emitted to a target is a high-speed impulse. A signal obtained when a high-speed impulse signal is modified according to a target and reflected from the target has the same frequency as the impulse signal, and thus an expensive high-speed ADC is required to detect the signal. However, according to the present embodiment, the extended signal Se has a low frequency lower than those of the impulse signal and a reflected signal. Therefore, a digital code corresponding to the reflected signal Rx sampled at a high resolution can be formed without using an expensive ADC.

Although the embodiments illustrated in the drawings have been described above to help understand the present disclosure, these embodiments are only examples and it will be apparent to those of ordinary skill in the art that various modifications may be made and other equivalent embodiments are derivable from the embodiments. Therefore, the scope of the present disclosure should be defined by the appended claims.

DESCRIPTION OF NUMERALS

10: detection device
100: receiver
110: sample and extension circuit unit
120: ADC
200: timing controller
210: TDC
220: clock generator
500: transmitter
510: edge former
520: window generator
530: push-pull stage

What is claimed is:

1. A detection device comprising:
a transmitter configured to output an impulse signal; and
a receiver configured to receive and process a reflected signal obtained by reflecting the impulse signal from a target,
wherein the receiver comprises a sample and extension unit configured to sample a received signal and extend a duration of a value obtained by sampling the received signal to form an extended signal extended to a frequency lower than a frequency of the reflected signal,
wherein the receiver comprises the sample and extension unit including a plurality of unit sample and extension circuits, and
wherein the plurality of unit sample and extension circuits each comprises:
an input node to which the reflected signal is input;
an output node from which the extension signal is output;
a storage element storing a value obtained by sampling the reflected signal;
a sampling switch connected between the input node and the storage element and configured to sample the reflected signal; and
an extension switch connected between the storage element and the output node and configured to output the extended signal.

2. The detection device of claim 1, wherein the target comprises an object outside the detection device.

3. The detection device of claim 1, wherein, in the plurality of unit sample and extension circuits, the input nodes are connected to each other, and the output nodes are connected to each other.

4. The detection device of claim 1, wherein the sampling switch is operated by a sampling clock, and
the extension switch is operated by an extension clock of a frequency lower than a frequency of the sampling clock to output a value stored in the storage element and form the extended signal.

5. The detection device of claim 1, wherein the receiver further comprises an analog-to-digital converter configured to receive the extended signal and form a digital code corresponding to the extended signal.

6. The detection device of claim 5, further comprising a neural network circuit configured to receive the digital code and detect the target's movement corresponding to the digital code.

7. The detection device of claim 1, further comprising a low-noise amplifier (LNA) configured to receive and amplify a signal reflected from the target to form the reflected signal.

8. The detection device of claim 1, further comprising a timing controller,
wherein the timing controller comprises:
a time-to-digital converter (TDC) configured to generate a digital code corresponding to a point in time that sampling is started by the sample and extension unit; and
a sampling clock generator configured to receive the digital code and form a plurality of sampling clocks starting from the point in time that sampling is started.

9. The detection device of claim 8, wherein the timing controller divides the reflected signal into a plurality of time sections and controls the TDC to generate a digital code corresponding to a start point of each of the plurality of time sections, and
the sampling clock generator receives the digital code corresponding to the start point of each of the plurality of time sections, and forms and outputs a plurality of sampling clocks starting from the start point of each of the plurality of time sections.

10. A detection method comprising:
emitting an impulse signal;
receiving a reflected signal obtained by reflecting the impulse signal from a target; and
sampling and extending the reflected signal to form an extended signal extended to a frequency lower than a frequency of the reflected signal,
wherein the sampling and extending of the reflected signal comprises:
sampling the reflected signal by a sampling clock; and
forming the extended signal by outputting a value, which is obtained by sampling the reflected signal, at a frequency lower than a frequency of the sampling clock,
wherein the value comprises a bit obtained by quantizing the reflected signal, and
the sampling of the reflected signal and the forming of the extended signal are performed a plurality of times.

11. The detection method of claim 10, wherein the target comprises an object outside a detection device.

12. The detection method of claim 10, wherein the sampling of the reflected signal is performed by controlling a switch at a point in time that the sampling clock is provided to store a value of the reflected signal, and
the forming of the extended signal is performed by outputting a value of the reflected signal sampled by a switch conducted at a frequency lower than a frequency of the sampling clock.

13. The detection method of claim 10, further comprising performing a pre-charging process before the sampling of the reflected signal.

14. The detection method of claim 10, further comprising receiving the extended signal and forming a digital code corresponding to the extended signal after the forming of the extended signal.

15. The detection method of claim 14, wherein a neural network circuit receives the digital code and detects the target's movement corresponding to the digital code.

16. The detection method of claim 10, wherein the reflected signal is formed by amplifying a signal reflected from the target by a low-noise amplifier (LNA).

17. The detection method of claim 10, further comprising:
generating a digital code corresponding to a time period from a point in time that the impulse signal is output to a point in time that the reflected signal is received; and
forming a plurality of sampling clocks to correspond to the digital code starting from the point in time that the reflected signal is received.

18. The detection method of claim 17, further comprising:
dividing the reflected signal into a plurality of time sections;
generating a digital code corresponding to a start point of each of the plurality of time sections; and
receiving the digital code corresponding to the start point of each of the plurality of time sections and forming and outputting a plurality of sampling clocks starting from the start point of each of the plurality of time sections.

* * * * *